(12) United States Patent
Peterson

(10) Patent No.: US 7,513,327 B1
(45) Date of Patent: Apr. 7, 2009

(54) SYSTEM FOR CONVERTING A RECREATIONAL VEHICLE

(76) Inventor: Kent Peterson, P.O. Box 174, La Moure, ND (US) 58458

(*) Notice: Subject to any disclaimer, the term of this patent is extended or adjusted under 35 U.S.C. 154(b) by 447 days.

(21) Appl. No.: 11/249,695

(22) Filed: Oct. 13, 2005

(51) Int. Cl.
*B62B 19/00* (2006.01)

(52) U.S. Cl. .................. 180/183; 180/182; 180/9.21

(58) Field of Classification Search .......... 180/183, 180/185, 186, 9.21, 9.26, 184; 280/9, 13
See application file for complete search history.

(56) References Cited

U.S. PATENT DOCUMENTS

| | | | |
|---|---|---|---|
| 3,521,717 A | 7/1970 | Coons | |
| 3,664,447 A | 5/1972 | Kane | |
| 3,667,562 A * | 6/1972 | Compton | 180/184 |
| 3,774,706 A | 11/1973 | Kiekhaefer | |
| 3,822,755 A * | 7/1974 | Hine | 180/185 |
| 4,082,155 A | 4/1978 | McCartney | |
| 4,195,702 A | 4/1980 | Denis | |
| 4,204,582 A * | 5/1980 | van Soest | 180/183 |
| 4,314,618 A * | 2/1982 | Tamura | 180/193 |
| 4,488,616 A * | 12/1984 | Harris | 180/185 |
| 4,719,982 A * | 1/1988 | Shaver | 180/183 |
| 5,564,517 A * | 10/1996 | Levasseur | 180/185 |
| 6,095,275 A * | 8/2000 | Shaw | 180/185 |
| 6,412,582 B1 | 7/2002 | Leavitt | |
| 6,431,301 B1 * | 8/2002 | Forbes | 180/185 |
| 6,708,791 B2 * | 3/2004 | Alexander | 180/182 |
| 6,742,612 B2 * | 6/2004 | Campbell et al. | 180/6.48 |
| 6,823,957 B2 * | 11/2004 | Girouard et al. | 180/190 |
| 6,824,147 B2 * | 11/2004 | Ouellette | 280/7.14 |
| 6,874,586 B2 * | 4/2005 | Boivin et al. | 180/9.26 |
| 7,357,201 B2 * | 4/2008 | Jordan | 180/9.26 |
| 2003/0201127 A2 * | 10/2003 | Girouard et al. | 180/183 |
| 2004/0026146 A1 * | 2/2004 | Mallette et al. | 180/183 |

* cited by examiner

*Primary Examiner*—Paul N Dickson
*Assistant Examiner*—Tashiana Adams
(74) *Attorney, Agent, or Firm*—Jeffrey A. Proehl; Woods, Fuller, Shultz & Smith, PC

(57) ABSTRACT

A system for converting a snowmobile into a wheeled vehicle is disclosed, and comprises a pair of wheel mounting assemblies for each being mounted on one of the front skid support assemblies of the snowmobile, and a swing arm for mounting on the snowmobile in a manner such that the swing arm is pivotable with respect to the frame. The swing arm has a forward end and a rearward end, and is mountable on the drive shaft such that the swing arm is pivotable with respect to the drive shaft. An axle is mounted on the swing arm toward the rearward end thereof, and a suspension mounting assembly is provided for mounting on the frame of the snowmobile and controlling pivot movement of the swing arm.

17 Claims, 8 Drawing Sheets

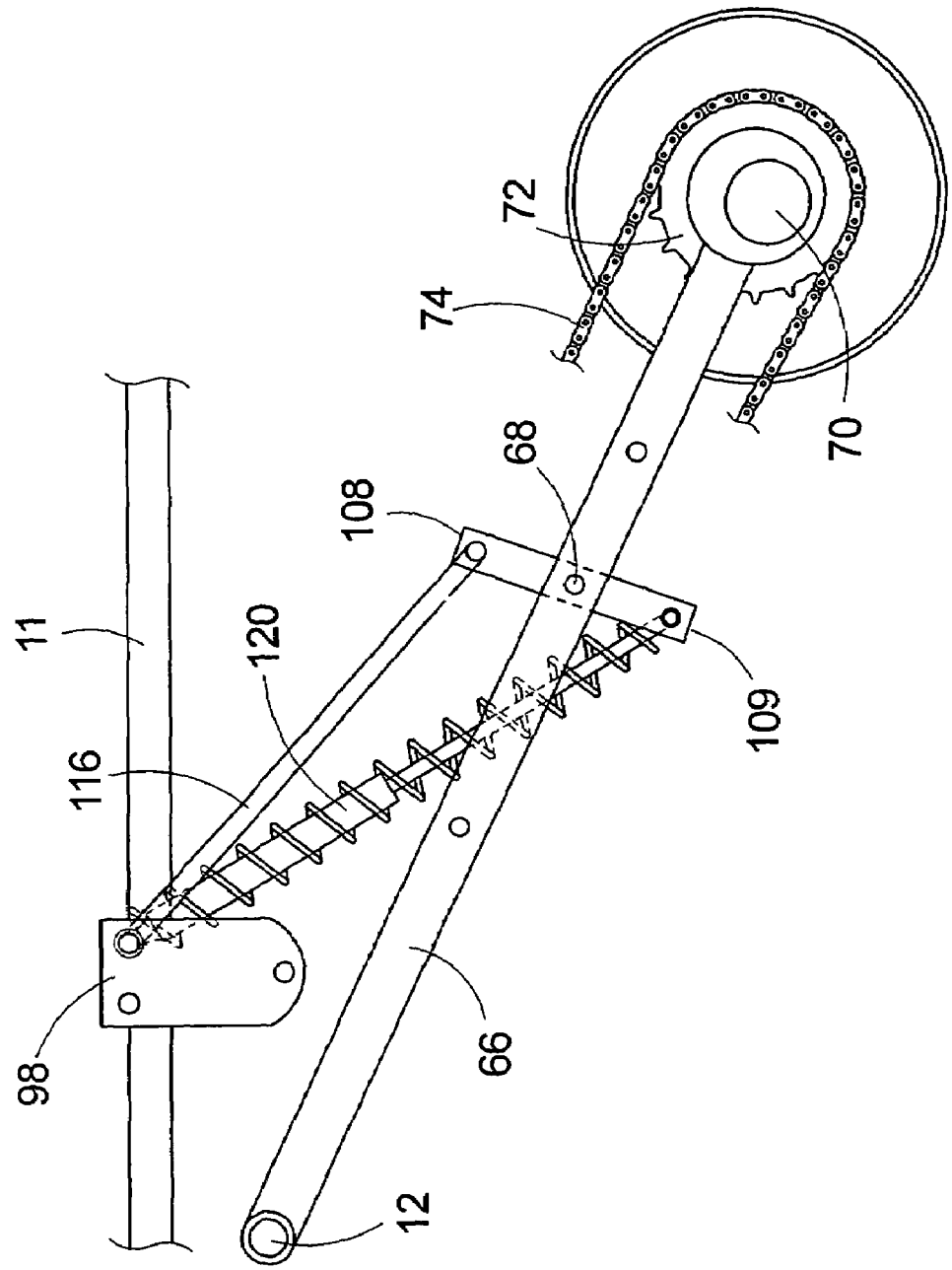

SYSTEM FOR CONVERTING A RECREATIONAL VEHICLE

BACKGROUND OF THE INVENTION

1. Field of the Invention

The present invention relates to off-road recreational vehicles and more particularly pertains to a new system for converting a recreational vehicle that permits the temporary transformation of a snowmobile into a wheeled vehicle capable of being safely operated off of snow on dry surfaces in warmer conditions, and without compromising the handling characteristics of the converted vehicle.

2. Description of the Prior Art

Off-road recreational vehicles, such as snowmobiles and four wheel all-terrain vehicles, are highly popular for recreational use, and growing in popularity. Unfortunately, the use of these different types of recreational vehicles tends to be restricted to different seasons of the year, during which only one of these types of recreational vehicles can normally and safely be used, and thus the other types of vehicle cannot be used and must be stored. Thus, those persons who enjoy such riding must obtain vehicles of both types in order to be able enjoy riding year round.

A number of different apparatus have been proposed to permit user to convert different types of recreational vehicles into other types of vehicles, and a number of these apparatus have been proposed to convert snowmobiles into wheeled vehicle. However, the known proposals would appear to produce vehicles that may have compromised handling characteristics that are quite unlike the handling characteristics of the original snowmobile because the suspension is compromised and the height of the center of gravity increased, and that may not readily permit the conversion of the wheeled vehicle back into a snowmobile because they are not readily adapted to the conventional snowmobile structures It is thus believed that there is a need in the art for a system for converting a recreational vehicle such as a snowmobile into a wheeled vehicle with desirable and safe handling characteristics that does not require significant alteration of the existing snowmobile and that may permit the converted wheeled vehicle to be converted back into the snowmobile.

SUMMARY OF THE INVENTION

In view of the foregoing disadvantages inherent in the known types of off-road recreational vehicles now present in the prior art, the present invention provides a new system for converting a recreational vehicle that permits the temporary transformation of a snowmobile into a wheeled vehicle capable of being safely operated off of snow on dry surfaces in warmer conditions, and without compromising the handling characteristics of the converted vehicle.

To attain this, the present invention generally comprises a system for converting a snowmobile into a wheeled vehicle. The system comprises a pair of wheel mounting assemblies for each being mounted on one of the front skid support assemblies of the snowmobile, and a swing arm for mounting on the snowmobile in a manner such that the swing arm is pivotable with respect to the frame. The swing arm has a forward end and a rearward end, and is mountable on the drive shaft such that the swing arm is pivotable with respect to the drive shaft. An axle is mounted on the swing arm toward the rearward end thereof, and a suspension mounting assembly is provided for mounting on the frame of the snowmobile and controlling pivot movement of the swing arm.

In one optional aspect of the invention, the suspension mounting assembly comprises an upper frame mount structure for mounting on the frame at a spaced location from the drive shaft, a rocker member pivotally mounted on the swing arm at a location spaced from the forward end of the swing arm, and the rocker member has a pair of opposite first and second ends. The optional suspension mounting assembly further includes a pivot link connecting the upper frame mount structure to the rocker member towards the first end thereof, and a shock absorber linking the suspension mounting assembly and the upper frame mount structure. The shock absorber is mounted on the rocker member toward the second end thereof. The rocker member is mounted on the swing arm at a location between the pivot link and the shock absorber.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

One significant aspect of the present invention is the simple and straightforward manner in which a conventional snowmobile may be converted into a wheeled vehicle that exhibits a relatively low center of gravity, and thus handles stably and predictably for the rider, and does not require destruction or compromise of the parts of the snowmobile so that re-conversion of the wheeled vehicle into a snowmobile is possible at the change of seasons.

Further advantageous aspects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects of the invention will become apparent when consideration is given to the following detailed description thereof. Such description makes reference to the annexed drawings wherein:

FIG. 8 is a schematic side view of the swing arm of the present invention.

DESCRIPTION OF PREFERRED EMBODIMENTS

Figure 1:
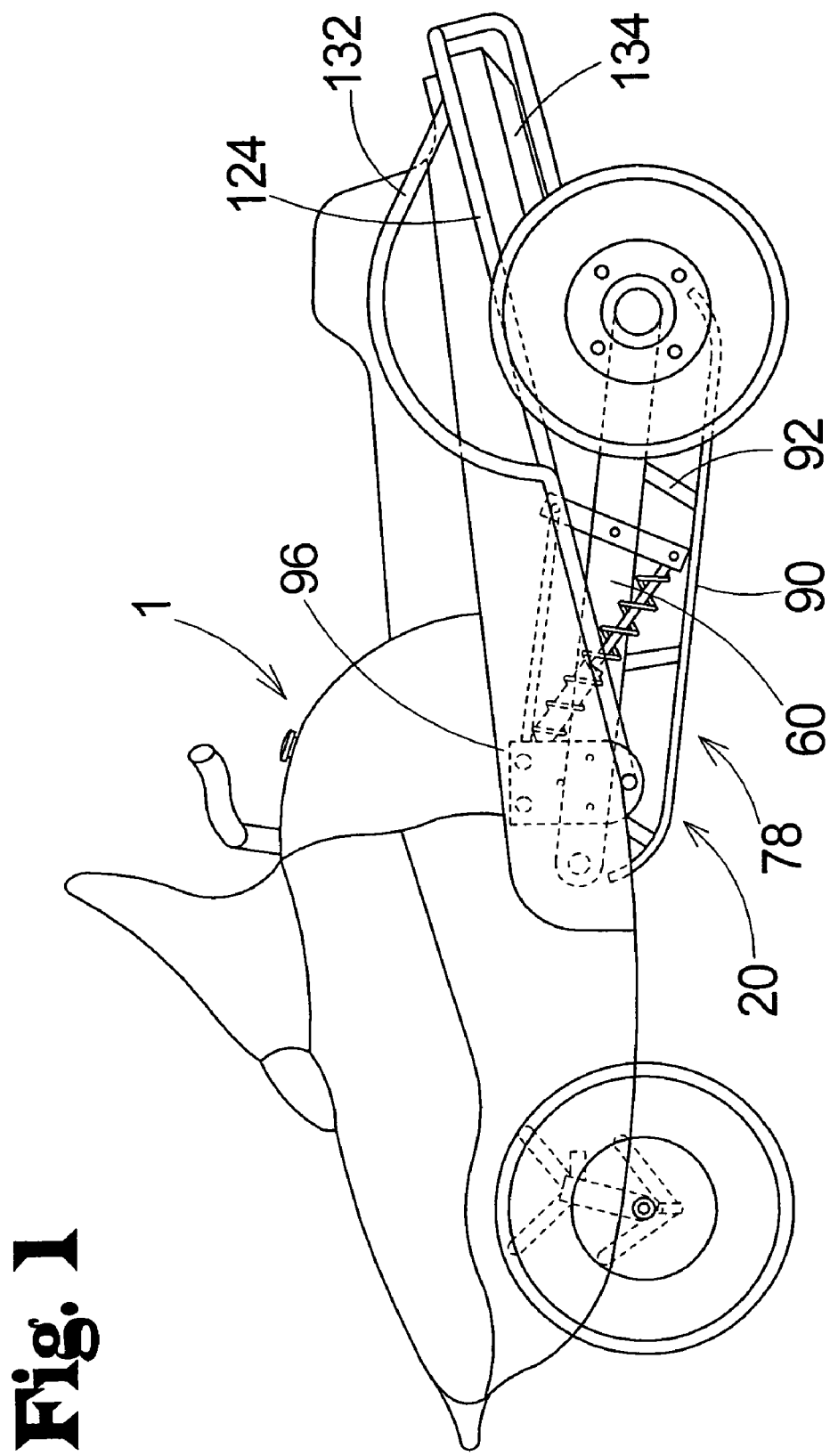
FIG. 1 is a schematic side view of a snowmobile having elements of the new system for converting a recreational vehicle according to the present invention installed thereon.
Figure 2:
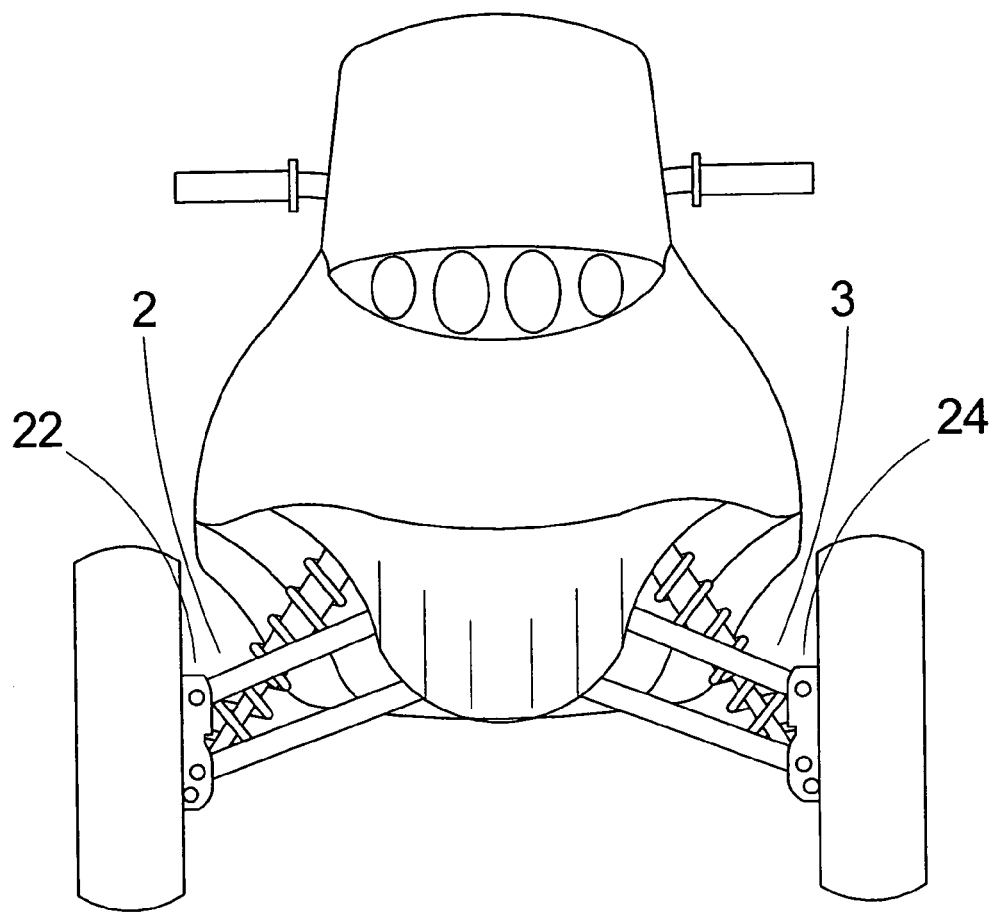
FIG. 2 is a schematic front view of the snowmobile with elements of the present invention installed thereon.
Figure 3:
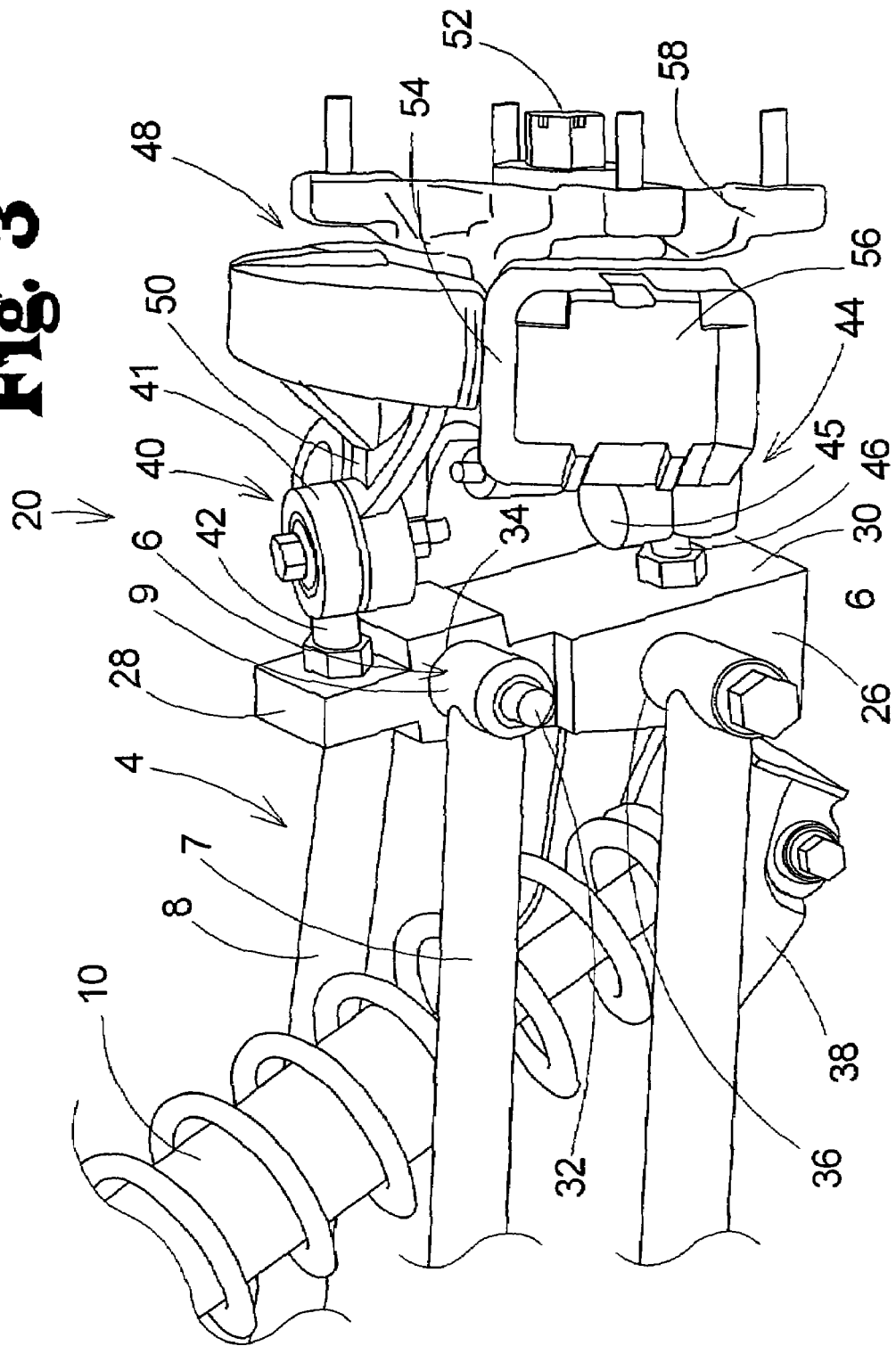
FIG. 3 is a schematic front view of a broken away portion of the front skid support assembly with elements of the wheel mounting assembly mounted thereon.
Figure 4:
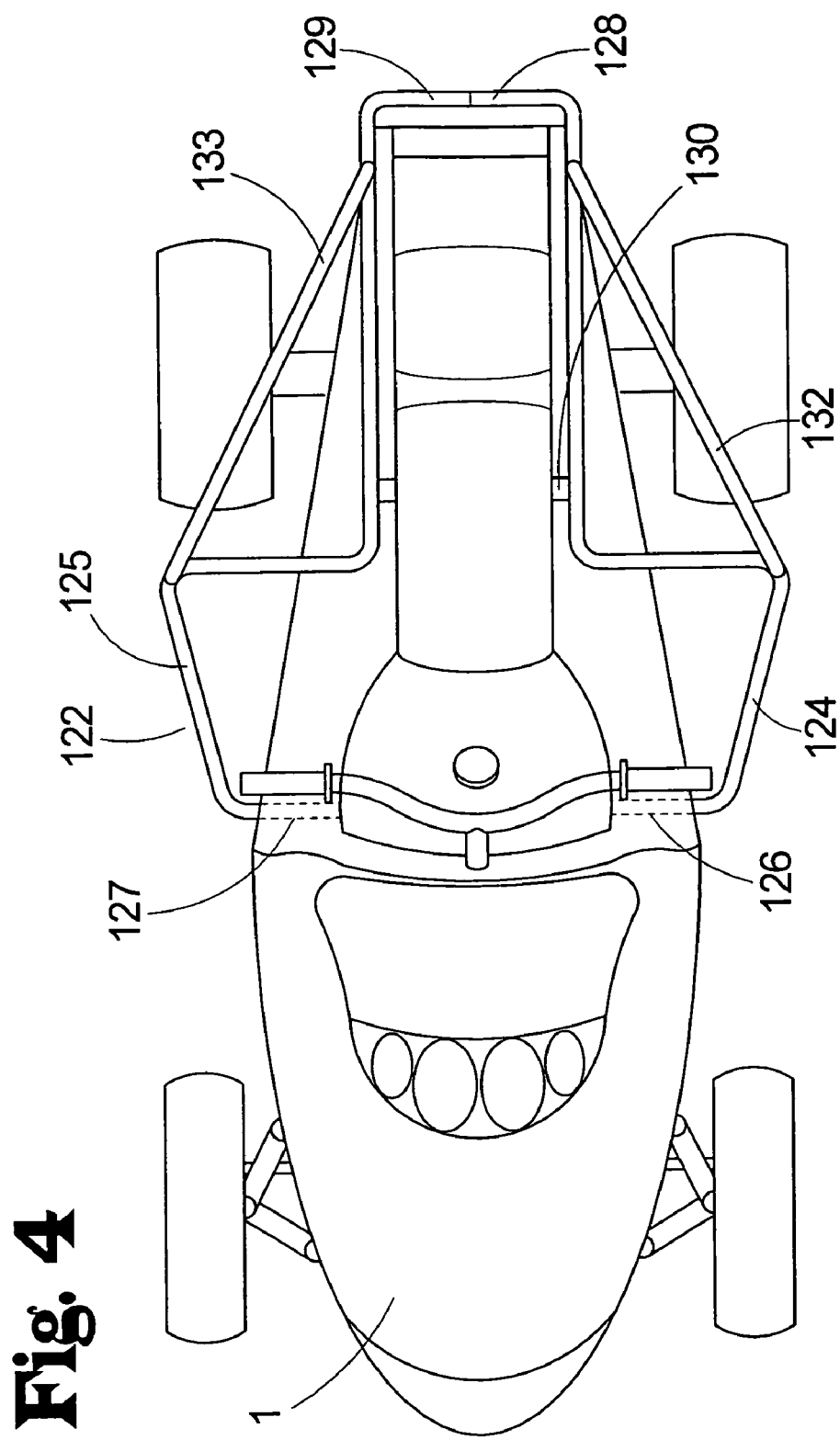
FIG. 4 is a schematic top view of the snowmobile with aspects of the present invention installed thereon.
Figure 5:
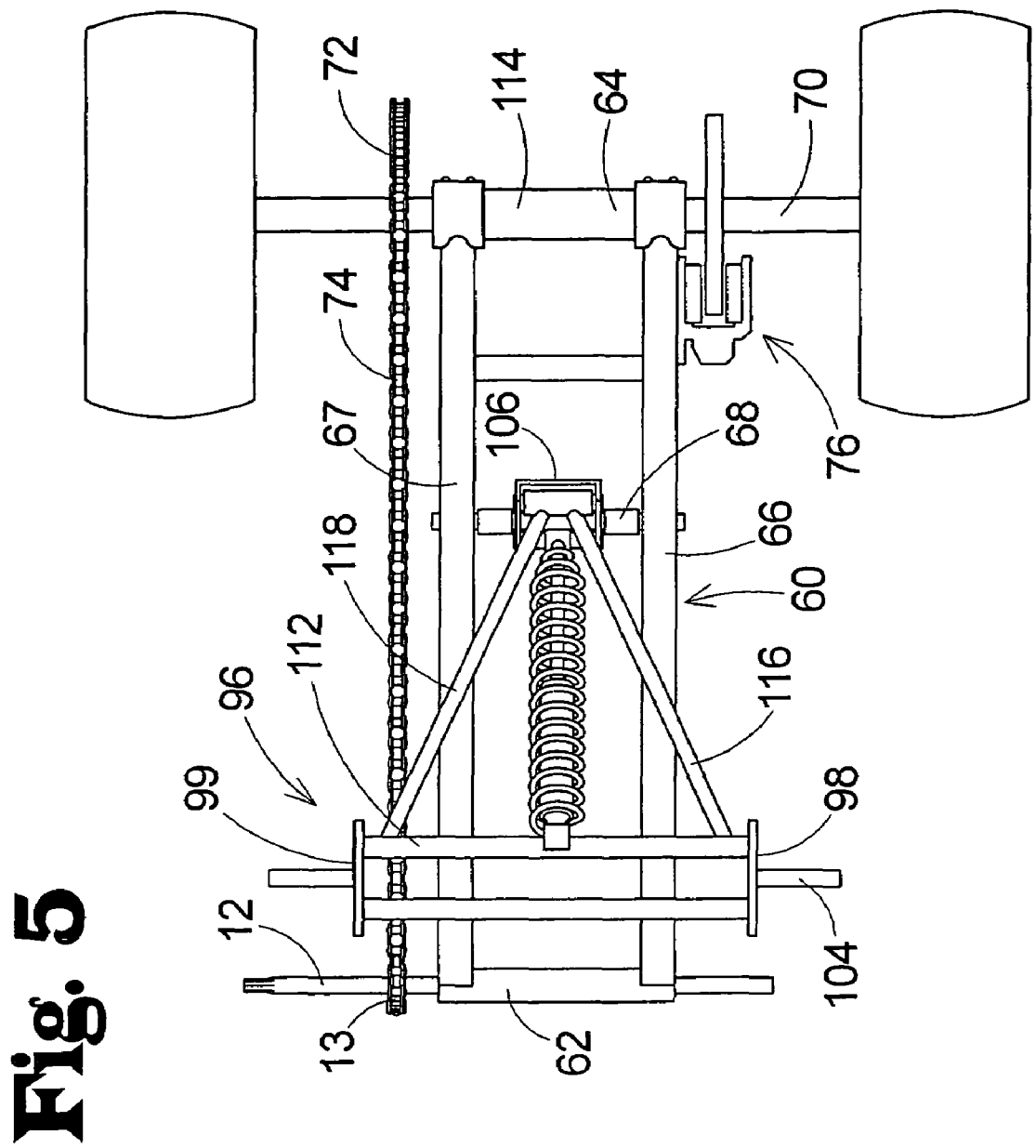
FIG. 5 is a schematic top view of elements of the swing arm and suspension mounting assembly of the present invention.
Figure 6:
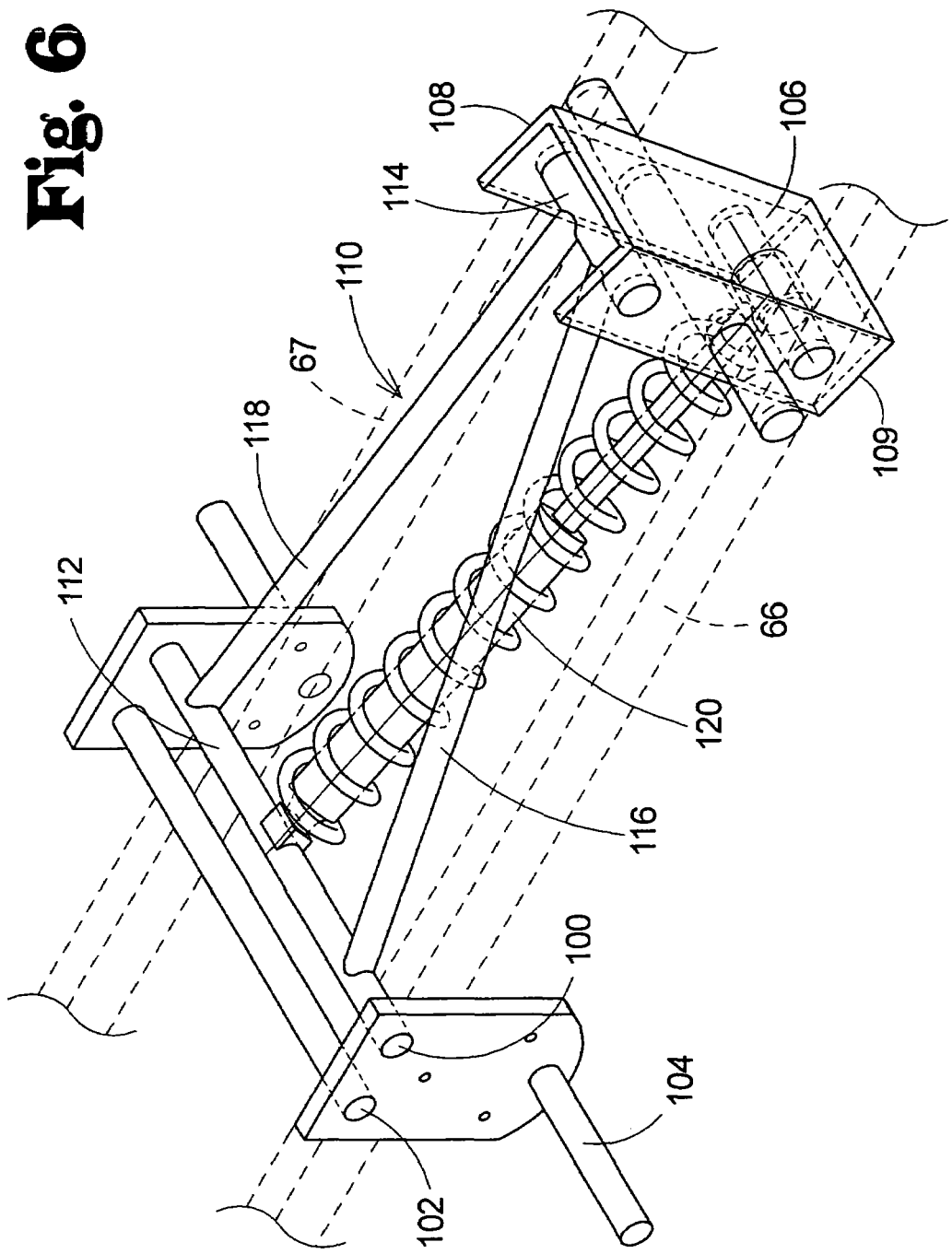
FIG. 6 is a schematic perspective view of elements of the swing arm and suspension mounting assembly of the present invention.
Figure 7:
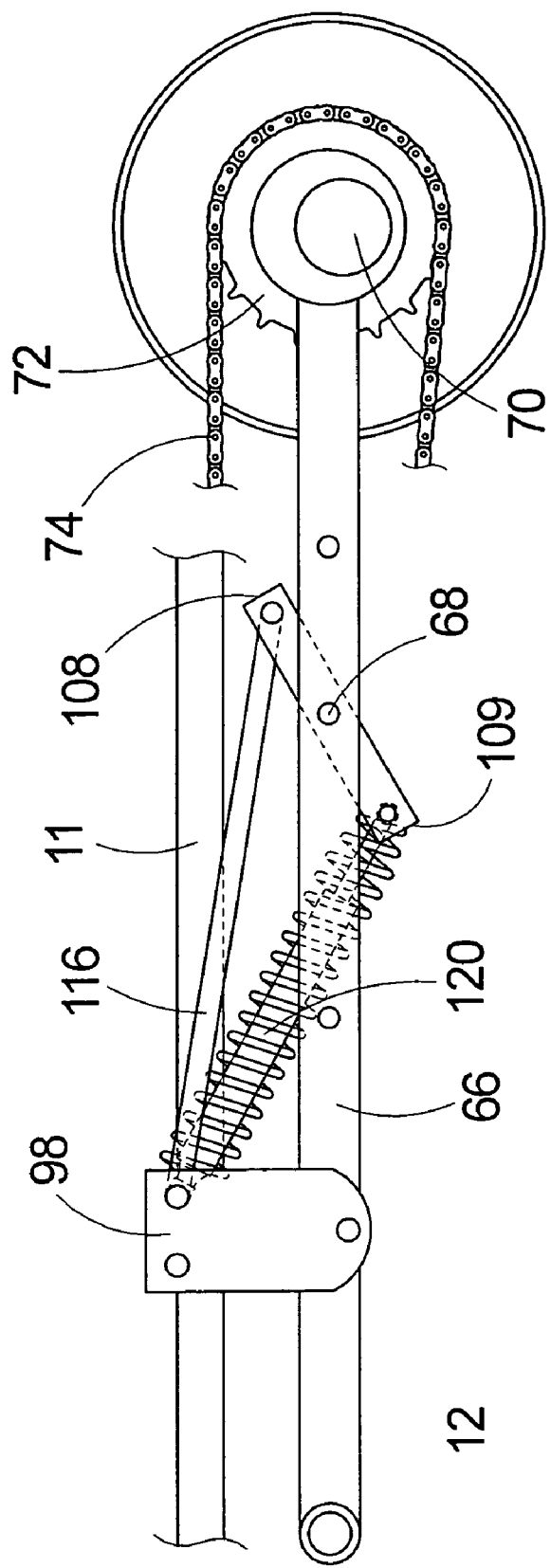
FIG. 7 is a schematic side view of the swing arm of the present invention in a raised position.

With reference now to the drawings, and in particular to FIGS. 1 through 8 thereof, a new system for converting a recreational vehicle embodying the principles and concepts of the present invention and generally designated by the reference numeral 20 will be described.

The system 20 of the present invention is primarily directed to the conversion of a snowmobile 1 into a wheeled vehicle 10 in a manner that does not detract from the ability to reconfigure the vehicle as a snowmobile, and generally can be performed by the removal of some parts from the snowmobile and attachment of new parts and assemblies in a manner that permits the future removal of the parts, although this is not a critical feature of the invention, and a more permanent and less reversible conversion of the snowmobile may be performed.

For the ease of description, some of the more relevant elements of the snowmobile 1 will first be described in order to provide a context for describing the elements of the invention. It should be understood that some snowmobiles to which this invention van be applied may or may not have all of these elements, and may also include additional elements. The snowmobile 1 may be of the type that includes a pair of front skid support assemblies 2, 3 that are designed to support the skids or skis (not shown) of the snowmobile. Each of the front skid support assemblies 2, 3 comprises an upper arm structure 4 and a lower arm structure 5 in substantially parallel relationship to each other. Each of the upper 4 and lower 5 arm structures has an outboard end 6. Each of the upper 4 and lower 5 arm structures includes a pair of arms 7, 8. Each arm 7, 8 has a mounting sleeve 9 on the outboard end 6 of the arm structure 4, 5. Each of the front skid support assemblies 2, 3 may also include a shock absorber 10. The illustrative snowmobile 1 may also be of the type that has a frame 11 and a rotating drive shaft 12 that is mounted on the frame, as well as a drive sprocket 13 that is mounted on the drive shaft 12.

The system 20 of the invention for converting the snowmobile 1 into a wheeled vehicle may include components for converting the front skid assembly to a pair of steerable, and optionally brakeable, wheels. The system may thus include a pair of wheel mounting assemblies 22, 24 for each being mounted on one of the front skid support assemblies 2, 3 of the snowmobile. Each of the wheel mounting assemblies 22, 24 may comprise an outboard suspension mount 26 for mounting to the outboard ends 6 of the upper 4 and lower 5 arm structures of the front skid support assemblies. The outboard suspension mount 26 may include an upper mount portion 28 for mounting to the upper arm structure 4 and a lower mount portion 30 for mounting to the lower arm structure 5. The upper mount portion 28 may be positionable between the arms 7, 8 of the outboard end 6 of the upper arm structure 4 and similarly the lower mount portion 30 may be positionable between the arms of the outboard end of the lower arm structure 5. The upper mount portion 28 and the lower mount portion 30 may each have a passage or channel formed therethrough for receiving a shaft 32 that extends through the mounting sleeves 9 of the outboard ends 6 of the arms 7, 8, of the arm structures 4, 5. The outboard suspension mount 26 may have an upper mount aperture 34 in the upper mount portion 28 and a lower mount aperture 36 in the lower mount portion 30.

The system 20 may also include a shock mount structure 38 for mounting to the shock absorber 10 of the front skid support assembly 2, 3. The shock mount structure 38 may be substantially rigidly mounted on an inner side of the outboard suspension mount 26, and the shock absorber 10 may be pivotally mounted on the shock mount structure 38. The particular shape and size and configuration of the shock mount structure 38 may be adapted to different shock absorber 10 positioning on different snowmobiles as the position varies from brand to brand and model to model, thus the structure 38 illustrated is only illustrative of the different configurations that may be employed.

The system 20 may include an upper pivot structure 40 that is mounted on the upper mount portion 28 of the outboard suspension mount 26. The upper pivot structure 40 may be mounted on an outer side of the upper mount portion 28. The upper pivot structure 40 may include an upper ball joint 41 and a threaded shaft 42 mounted on the upper mount portion 28, and the threaded shaft 42 extends into the upper mount aperture 34. The system may also include a lower pivot structure 44 that is mounted on the lower mount portion 36 of the outboard suspension mount 26, and may be mounted on an outer side of the lower mount portion 30. The lower pivot structure 44 may include a lower ball joint 45 and a threaded shaft 46 that is mounted on the lower mount portion 30, and may extend into the lower mount aperture 36.

The system 20 may include an outer wheel mount structure 48 that is mounted on the upper 40 and lower 44 pivot structures. The outer wheel mount structure 48 may include a wheel mount member 50 that is attached to each of the upper 40 and lower 44 pivot structures. The mount structure 48 may also include a stub axle 52 rotationally mounted on the wheel mount member 50, a brake disc 54 mounted on the stub axle 52, a brake caliper 56 attached to the wheel mount member 50 for acting on the brake disc, and a stud support member 58 that is mounted on the stub axle 52 to rotate with the stub axle. Since a conventional snowmobile does not include front brake means, the brake caliper 56 may be actuated by a master hydraulic actuating cylinder mounted on the handle bar of the converted vehicle.

The system 20 may also include components that are employed to implement the rear set of wheels on the modified snowmobile. The system 20 thus includes a swing arm 60 for mounting on the snowmobile 1 in a manner such that the swing arm is pivotable with respect to the frame 11 of the snowmobile. The swing arm 60 may be mountable on the drive shaft 12 such that the swing arm is pivotable with respect to the drive shaft, and so that all locations on the swing arm remain at a substantially uniform distance from the drive shaft and the drive sprocket 13. The swing arm 60 has a forward end 62 and a rearward end 64, and the forward end 62 may form a forward sleeve for receiving a portion of the drive shaft 12 and the rearward end forming an axle sleeve for receiving a portion of the rear axle.

The swing arm 60 may include a pair of lateral members 66, 67 that extend between the ends 62, 64 of the swing arm. A plurality of transverse members 68 extend between the lateral members 66, 67. A forward one of the transverse members forms the forward sleeve 62 and a rearward one of the transverse members forms the axle sleeve 64. An axle shaft 70 is mounted on the swing arm 60, and extends through the axle sleeve 64. A driven sprocket 72 may be mounted on the axle shaft 70. A chain 74 may connect the driven sprocket 72 to the drive sprocket 13 for transferring rotational motion. A brake assembly 76 may be mounted on the axle shaft 70 for controlling rotation of the axle shaft, and may use the braking system that is conventionally employed on the snowmobile to control rotation of the shaft rotating the snow track. In some embodiments of the invention, eccentric axle bearing carriers are mounted on the axle sleeve at laterally spaced locations so that rotation of the eccentric axle bearing carriers with respect to the axle sleeve tends to lengthen or shorten the distance between the axle and the drive shaft, and the thus the drive sprocket and the driven sprocket, to adjust the tension in the chain.

A skid assembly 78 may be mounted on the swing arm 60, and may extend downwardly from the swing arm to protect the swing arm and the components mounted on the swing arm. The skid assembly 78 may comprise a skid plate 90 that oriented in a spaced relationship to the swing arm 60, and a skid plate support frame 92 that supports the skid plate on the swing arm.

The system 20 may include a suspension mounting assembly 94 for mounting on the frame 11 of the snowmobile 1 and controlling pivot movement of the swing arm 60. The suspension mounting assembly 94 may comprise an upper frame mount structure 96 for mounting on the frame 11, preferably at a location rearward of the drive shaft 12. The upper frame mount structure 96 may comprise a pair of spaced side mounts 98. Each of the side mounts 98 may comprise a plate that may be oriented substantially parallel to each other. At least one connector member 100, and preferably two connector members 100 and 102, connect the spaced side mounts 98 together. The two connector members may include a forward connector member 102 and a rearward connector member 100. A pair of mounting ears 104 may extend laterally outwardly from each one of the spaced side mounts 98, 99. These ears 104 may engage the forward ends 127, 128 of the primary side bars 124, 125 discussed below.

The suspension mounting assembly 94 may include a rocker member 106 that is pivotally mounted on the swing arm 60, and that has a pair of opposite first 108 and second 109 ends. The rocker member 106 is pivotally mounted on one of the transverse members 68 of the swing arm 60. The rocker member 106 may be pivotally mounted to the swing arm at a medial location on the rocker member between the first 108 and second 109 ends. The rocker member 106 may be located between the lateral members 66, 67 of the swing arm, with the first end 108 of the rocker member being positioned above the swing arm and the second end 109 being positioned below the swing arm.

The suspension mounting assembly 94 may further include a pivot link 110 that connects the upper frame mount structure 96 to the rocker member 106. The pivot link 110 may be mounted on one of the connector members 100 of the upper frame mount structure 96. The pivot link 110 may be connected to the first end 108 of the rocker member 106. The pivot link 110 may comprise a first link member 112 that is mounted to the connector member 100 of the upper frame mount structure 96, and that defines a passage that receives the rearward connector member 100. The pivot link 110 may further comprise a second link member 114 that is mounted to the rocker member 106, and the second link defines a passage that receives a fastener that is mounted on the rocker member. The pivot link 110 further includes a pair of lateral link members 116, 118 that connect the first link member 112 to the second link member 114. In some embodiments, the pair of lateral link members 116, 118 generally converge toward the second link member 114 and generally diverge toward the first link member 112.

A shock absorber 120 may link the suspension mounting assembly 94 and the upper frame mount structure 96. Preferably, the shock absorber 120 includes a spring element as well as a dampening element, such as a coil spring positioned over the cylinder and piston/piston rod combination of the shock absorber. Optionally, a shock absorber with an air spring provision may be employed. The shock absorber 120 may be mounted on the rearward connector member 100 of the upper frame mount structure 96 and the first end 108 of the rocker member 106. The shock absorber 120 and the pivot link 110 thus act together to pivot the rocker member 106 as the swing arm 60 pivots upwardly and downwardly, with the pivot link having a relatively fixed length and the shock absorber having a relatively variable length. Upward pivot movement of the swing arm 60 (e.g. toward the frame 11) thus tends to shorten the shock absorber 120 against the spring mounted on the shock absorber, and downward pivot movement of the swing arm 60 (e.g., away from the frame 11) tends to lengthen the shock absorber. This relationship tends to keep the frame 11 moved upwardly from, or suspended above, the rearward end of the swing arm. In one preferred embodiment, the ratio of rear axle travel to shock absorber stroke is approximately 2 to 1.

The system may include other elements that facilitate the conversion of the snowmobile to a wheeled vehicle. For example, a protective bar assembly 122 may be provided mounting on the frame 11 of the snowmobile 1 that extends outwardly from the frame, particularly the rear portions of the frame, to provide some measure of protection for the rear wheels of the converted vehicle, which tend to extend laterally past the side of the body panels and cowlings of the snowmobile. The protective bar assembly 122 may comprise a pair of primary side bars 124, 125, with each primary side bar extending laterally outward from a respective side of the frame of the snowmobile. Each of the primary side bars 124, 125 may include a forward end 126, 127 that is connected to the frame, and a rearward end 128, 129 that is attached to the rearward end 129, 128 of the other of the side bars 125, 124. An auxiliary mount 130 may extend inwardly from a medial portion of each of the primary side bars 124, 125 and may be mounted on the frame 11. The protective bar assembly 122 may further include a pair of secondary side bars 132, 134 that each extend from one of the primary side bars 124, 126. Optionally, the side bars may be covered or serve as mounting points for material that functions as fenders.

The system 20 may also include a radiator 134 for mounting on a rearward location on the frame 11 of the snowmobile to provide enhanced cooling for the vehicle in the typical season of use, and may be connected to the liquid cooled elements of the motor of the snowmobile. A cooling fan may also be employed with the radiator 134 in a manner known to those skilled in the art. The radiator 134 may be mountable in a substantially inclined orientation on the frame, and the inclined orientation may be more horizontally oriented than vertically oriented.

The system 20 of the invention may be easily installed upon the snowmobile once the front skids have been removed from the upper and lower skid support assemblies and the track, rear skid frame suspension, and drive shaft has been performed. The drive shaft is replaced on the converted vehicle with the forward end 62 of the swing arm 60 mounted on the drive shaft.

It will be recognized that the invention as disclosed above results in a converted vehicle with a relatively lower center of gravity, wider track size, and longer wheelbase than many other convention all terrain or off-highway vehicles, which thus can produce a vehicle with exceptionally stable handling characteristics.

With respect to the above description then, it is to be realized that the optimum dimensional relationships for the parts of the invention, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

| | |
|---|---|
| 1. | snowmobile |
| 2. | (left) front skid support assembly |
| 3. | (right) front skid support assembly |
| 4. | upper arm structure |
| 5. | lower arm structure |
| 6. | outboard end of structure |
| 7. | (forward) arm of structure |
| 8. | (rearward) arm of structure |
| 9. | mounting sleeve |
| 10. | shock absorber |
| 11. | frame |
| 12. | drive shaft |
| 13. | drive sprocket |
| 14. | |
| 15. | |
| 16. | |
| 17. | |
| 18. | |
| 19. | |
| 20. | system |
| 21. | |
| 22. | (left) wheel mounting assembly |
| 23. | |
| 24. | (right) wheel mounting assembly |
| 25. | |
| 26. | outboard suspension mount |
| 27. | |
| 28. | upper mount portion |
| 29. | |
| 30. | lower mount portion |
| 31. | |
| 32. | shaft connecting susp mount to arms |
| 33. | |
| 34. | upper mount aperture |
| 35. | |
| 36. | lower mount aperture |
| 37. | |
| 38. | shock mount structure |
| 39. | |
| 40. | upper pivot structure |
| 41. | upper ball joint |
| 42. | upper threaded shaft |
| 43. | |
| 44. | lower pivot structure |
| 45. | lower ball joint |
| 46. | lower threaded shaft |

-continued

| | |
|---|---|
| 47. | |
| 48. | outer wheel mount structure |
| 49. | |
| 50. | wheel mount member |
| 51. | |
| 52. | stub axle |
| 53. | |
| 54. | brake disc |
| 55. | |
| 56. | brake caliper |
| 57. | |
| 58. | stud support member |
| 59. | |
| 60. | swing arm |
| 61. | |
| 62. | forward end (sleeve) of swing arm |
| 63. | |
| 64. | rearward end (sleeve) of swing arm |
| 65. | |
| 66. | (first) lateral members |
| 67. | (second) lateral member |
| 68. | transverse members |
| 69. | |
| 70. | axle |
| 71. | |
| 72. | driven sprocket |
| 73. | |
| 74. | chain |
| 75. | |
| 76. | brake assembly |
| 77. | |
| 78. | skid assembly |
| 79. | |
| 80. | |
| 81. | |
| 82. | |
| 83. | |
| 84. | |
| 85. | |
| 86. | |
| 87. | |
| 88. | |
| 89. | |
| 90. | skid plate |
| 91. | |
| 92. | skid plate support frame |
| 93. | |
| 94. | suspension mounting assembly |
| 95. | |
| 96. | upper frame mount structure |
| 97. | |
| 98. | (first) spaced side mounts |
| 99. | (second) spaced side mount |
| 100. | (rearward) connector member |
| 101. | |
| 102. | (forward) connector member |
| 103. | |
| 104. | mounting ear |
| 105. | |
| 106. | rocker member |
| 107. | |
| 108. | first end of rocker member |
| 109. | second end of rocker member |
| 110. | pivot link |
| 111. | |
| 112. | first link member |
| 113. | |
| 114. | second link member |
| 115. | |
| 116. | (left) lateral link member |
| 117. | |
| 118. | (right) lateral link member |
| 119. | |
| 120. | shock absorber |
| 121. | |
| 122. | protective bar assembly |
| 123. | |
| 124. | (first) primary side bar |
| 125. | (second) primary side bar |

-continued

| | |
|---|---|
| 126. | (first) forward end |
| 127. | (second) forward end |
| 128. | (first) rearward end |
| 129. | (second) rearward end |
| 130. | auxiliary mount |
| 131. | |
| 132. | (first) secondary side bar |
| 133. | (second) secondary side bar |
| 134. | radiator |
| 135. | |
| 136. | |
| 137. | |
| 138. | |
| 139. | |
| 140. | |
| 141. | |
| 142. | |
| 143. | |
| 144. | |
| 145. | |
| 146. | |
| 147. | |
| 148. | |
| 149. | |
| 150. | |
| 151. | |
| 152. | |
| 153. | |
| 154. | |
| 155. | |
| 156. | |
| 157. | |
| 158. | |
| 159. | |
| 150. | |

I claim:

1. A system for converting a snowmobile into a wheeled vehicle, the snowmobile being of the types including a frame, a pair of front skid support assemblies mounted on the frame, and a rotating drive shaft mounted on the frame, the system comprising:
a pair of wheel mounting assemblies for each being mounted on one of the front skid support assemblies of the snowmobile so that a first wheel is mountable on a first one of the front skid support assemblies and a second wheel is mountable on a second one of the front skid support assemblies;
a swing arm for mounting on the snowmobile in a manner such that the swing arm is pivotable with respect to the frame, the swing arm being mountable on the drive shaft such that the swing arm is pivotable with respect to the drive shaft, the swing arm having a forward end and a rearward end;
an axle mounted on the swing arm toward the rearward end thereof; and
a suspension mounting assembly for mounting on the frame of the snowmobile and controlling pivot movement of the swing arm;
wherein the forward end of the swing arm forms a forward sleeve for receiving a portion of the drive shaft, the rearward end of the swing arm forming an axle sleeve;
wherein the swing arm comprises:
a pair of lateral members extending between the ends of the swing arm; and
a plurality of transverse members extending between the lateral members, a forward one of the transverse members forming the forward sleeve and a rearward one of the transverse members forming the axle sleeve.

2. The system of claim 1 wherein the suspension mounting assembly comprises:
an upper frame mount structure for mounting on the frame at a spaced location from the drive shaft;
a rocker member pivotally mounted on the swing arm at a location spaced from the forward end of the swing arm, the rocker member having a pair of opposite first and second ends;
a pivot link connecting the upper frame mount structure to the rocker member towards the first end thereof; and
a shock absorber linking the suspension mounting assembly and the upper frame mount structure, the shock absorber being mounted on the rocker member toward the second end thereof;
wherein the rocker member is mounted on the swing arm at a location between the pivot link and the shock absorber.

3. The system of claim 2 wherein the upper frame mount structure comprises:
a pair of spaced side mounts; and
at least one connector member connecting the spaced side mounts together.

4. The system of claim 2 wherein the first end of the rocker member is positioned above the swing arm and the second end is positioned below the swing arm.

5. The system of claim 3 wherein the pivot link comprises:
a first link member mounted to the at least one connector member of the upper frame mount structure, the first link member defining a passage receiving the at least one connector member;
a second link member mounted to the rocker member, the second link defining a passage receiving a fastener mounted on the rocker member; and
a pair of lateral link members connecting the first link member to the second link member.

6. The system of claim 1 wherein the axle extends through the axle sleeve; and additionally comprising:
a driven sprocket mounted on the axle shaft;
a chain for connecting the driven sprocket to a drive sprocket mounted on the drive shaft for transferring rotational motion between the drive sprocket and the driven sprocket;
wherein a distance between the driven sprocket and the drive sprocket when the swing arm is mounted on the drive shaft is substantially constant as the swing arm is pivoted on the drive shaft.

7. The system of claim 1 wherein each of the wheel mounting assemblies comprises:
an outboard suspension mount for mounting to outboard ends of upper and lower arm structures of the front skid support assemblies;
a shock mount structure for mounting to a shock absorber of the front skid support assembly, the shock mount being mounted on the outboard suspension mount;
an upper pivot structure mounted on an upper mount portion of the outboard suspension mount;
a lower pivot structure mounted on a lower mount portion of the outboard suspension mount; and
an outer wheel mount structure mounted on the upper and lower pivot structures.

8. The system of claim 7 wherein the outer wheel mount structure includes:
a wheel mount member attached to each of the upper and lower pivot structures;
a stub axle rotationally mounted on the wheel mount member;
a brake disc mounted on the stub axle;

a brake caliper attached to the wheel mount member for acting on the brake disc; and a stud support member mounted on the stub axle to rotate with the stub axle.

9. A snowmobile converted to a wheeled vehicle, comprising:

a snowmobile including a frame, a pair of front skid support assemblies mounted on the frame, and a rotating drive shaft mounted on the frame;

a pair of wheel mounting assemblies each mounted on one of the front skid support assemblies of the snowmobile and configured so that a first wheel is mountable on a first one of the front skid support assemblies and a second wheel is mountable on a second one of the front skid support assemblies;

a swing arm mounted on the drive shaft of the snowmobile in a manner such that the swing arm is pivotable with respect to the drive shaft, the swing arm having a forward end and a rearward end;

an axle mounted on the swing arm toward the rearward end thereof; and a suspension mounting assembly mounted on the frame of the snowmobile, the suspension mounting assembly controlling pivot movement of the swing arm;

wherein the forward end of the swing arm forms a forward sleeve for receiving a portion of the drive shaft, the rearward end of the swing arm forming an axle sleeve;

wherein the swing arm comprises:
    a pair of lateral members extending between the ends of the swing arm; and
    a plurality of transverse members extending between the lateral members, a forward one of the transverse members forming the forward sleeve and a rearward one of the transverse members forming the axle sleeve.

10. The system of claim 9 wherein the suspension mounting assembly comprises:

an upper frame mount structure mounted on the frame at a spaced location from the drive shaft;

a rocker member pivotally mounted on the swing arm at a location spaced from the forward end of the swing arm, the rocker member having a pair of opposite first and second ends;

a pivot link connecting the upper frame mount structure to the rocker member towards the first end thereof; and a shock absorber linking the suspension mounting assembly and the upper frame mount structure, the shock absorber being mounted on the rocker member toward the second end thereof;

wherein the rocker member is mounted on the swing arm at a location between the pivot link and the shock absorber.

11. The system of claim 10 wherein the upper frame mount structure comprises:
    a pair of spaced side mounts; and
    at least one connector member connecting the spaced side mounts together.

12. The system of claim 10 wherein the first end of the rocker member is positioned above the swing arm and the second end is positioned below the swing arm.

13. The system of claim 11 wherein the pivot link comprises:
    a first link member mounted to the at least one connector member of the upper frame mount structure, the first link member defining a passage receiving the at least one connector member;
    a second link member mounted to the rocker member, the second link defining a passage receiving a fastener mounted on the rocker member; and
    a pair of lateral link members connecting the first link member to the second link member.

14. The system of claim 1 wherein the axle extends through the axle sleeve; and additionally comprising:
    a drive sprocket mounted on the drive shaft of the snowmobile;
    a driven sprocket mounted on the axle shaft;
    a chain connecting the driven sprocket to the drive sprocket for transferring rotational motion between the drive sprocket and the driven sprocket;
    wherein a distance between the driven sprocket and the drive sprocket when the swing arm is mounted on the drive shaft is substantially constant as the swing arm is pivoted on the drive shaft.

15. The system of claim 9 wherein each of the wheel mounting assemblies comprises:
    an outboard suspension mounted on outboard ends of upper and lower arm structures of the front skid support assemblies;
    a shock mount structure mounted to a shock absorber of the front skid support assembly, the shock mount being mounted on the outboard suspension mount;
    an upper pivot structure mounted on an upper mount portion of the outboard suspension mount;
    a lower pivot structure mounted on a lower mount portion of the outboard suspension mount; and
    an outer wheel mount structure mounted on the upper and lower pivot structures.

16. The system of claim 15 wherein the outer wheel mount structure includes:
    a wheel mount member attached to each of the upper and lower pivot structures;
    a stub axle rotationally mounted on the wheel mount member;
    a brake disc mounted on the stub axle;
    a brake caliper attached to the wheel mount member for acting on the brake disc; and
    a stud support member mounted on the stub axle to rotate with the stub axle.

17. A system for converting a snowmobile into a wheeled vehicle, the snowmobile being of the types including a frame, a pair of front skid support assemblies mounted on the frame, and a rotating drive shaft mounted on the frame, the system comprising:

a pair of wheel mounting assemblies for each being mounted on one of the front skid support assemblies of the snowmobile so that a first wheel is mountable on a first one of the front skid support assemblies and a second wheel is mountable on a second one of the front skid support assemblies;

a swing arm for mounting on the snowmobile in a manner such that the swing arm is pivotable with respect to the frame, the swing arm being mountable on the drive shaft such that the swing arm is pivotable with respect to the drive shaft, the swing arm having a forward end and a rearward end;

an axle mounted on the swing arm toward the rearward end thereof; and a suspension mounting assembly for mounting on the frame of the snowmobile and controlling pivot movement of the swing arm;

wherein the suspension mounting assembly comprises:
    an upper frame mount structure for mounting on the frame at a spaced location from the drive shaft;

a rocker member pivotally mounted on the swing arm at a location spaced from the forward end of the swing arm, the rocker member having a pair of opposite first and second ends;

a pivot link connecting the upper frame mount structure to the rocker member towards the first end thereof; and a shock absorber linking the suspension mounting assembly and the upper frame mount structure, the shock absorber being mounted on the rocker member toward the second end thereof;

wherein the rocker member is mounted on the swing arm at a location between the pivot link and the shock absorber;

wherein the upper frame mount structure comprises:

a pair of spaced side mounts; and at least one connector member connecting the spaced side mounts together;

wherein the pivot link comprises:

a first link member mounted to the at least one connector member of the upper frame mount structure, the first link member defining a passage receiving the at least one connector member;

a second link member mounted to the rocker member, the second link defining a passage receiving a fastener mounted on the rocker member; and a pair of lateral link members connecting the first link member to the second link member.

* * * * *